Oct. 24, 1950     F. A. PETERSON     2,527,149
CORN BUTTERER
Filed July 22, 1946
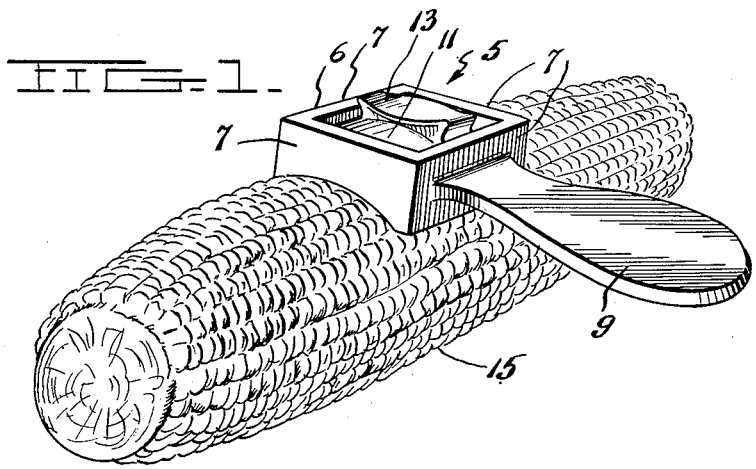
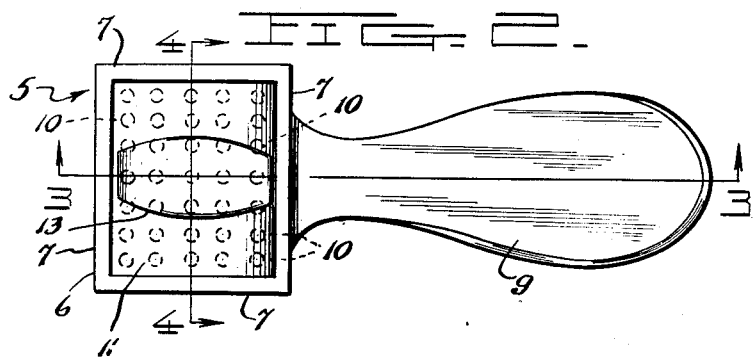
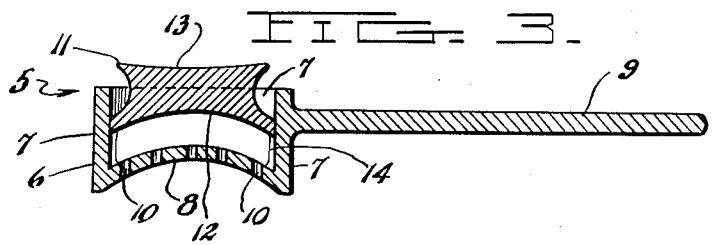
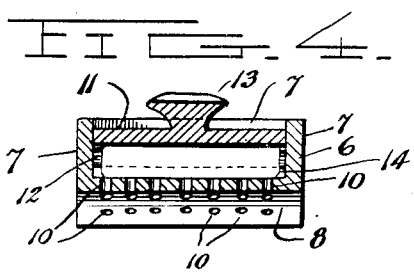
Inventor
*Francis A. Peterson*
By *Clarence A. O'Brien
and Harvey B. Jacobson*
Attorneys Patented Oct. 24, 1950

2,527,149

UNITED STATES PATENT OFFICE 2,527,149

CORN BUTTERER

Francis A. Peterson, Newport, R. I.

Application July 22, 1946, Serial No. 685,541

1 Claim. (Cl. 65—12)

This invention relates to new and useful improvements and structural refinements in utensils, and the principal object of the invention is to provide a device of the character herein described, such as may be conveniently and effectively employed for applying butter, or the like, to an ear of corn.

A further object of the invention is to provide a utensil whereby the butter may be easily applied in a uniform manner and with the minimum amount of waste.

Another object of the invention is to provide a utensil which is simple in construction and which can be easily kept clean.

An additional object of the invention is to provide a utensil which is pleasing in appearance and which will readily lend itself to economical manufacture.

With the above more important objects in view and such other objects as may become apparent as this specification proceeds, the invention consists essentially of the construction and arrangement of parts as shown in the accompanying drawings in which:

Figure 1 is a perspective view, showing the invention in use.

Figure 2 is a top plan view of the invention per se.

Figure 3 is a cross-sectional view, taken substantially in the plane of the line 3—3 in Figure 2, and Figure 4 is a cross-sectional view, taken substantially in the plane of the line 4—4 in Figure 2.

Like characters of reference are used to designate like parts in the specification and throughout the several views.

Referring now to the accompanying drawings in detail, the invention consists of a utensil designated generally by the reference character 5, the same embodying in its construction a receptacle 6 having a substantially rectangular configuration and consisting of the side walls 7 and the bottom 8. It will be noted that the receptacle 6 is open at the top thereof and a suitable, laterally projecting handle 9 is secured to one of the walls 7, as will be clearly understood from the drawings.

The bottom 8 of the receptacle 6 is concave and is formed with a plurality of perforations 10, the purpose of which will be hereinafter more fully explained.

A plunger block 11 is slidably and removably positioned in the receptacle 6, the under-surface 12 of the plunger block being concaved complementarily to the aforementioned concave bottom 8. The upper surface of the plunger block 11 is formed with a suitable finger grip 13, configurated substantially as shown.

It will be observed that the plunger block 11 is complementary to the opening in the receptacle 6, that is, the outer dimensions of the block are such that it fits snugly, yet slidably, between the receptacle walls 7.

When the invention is placed in use, a piece of butter 14, or the like, is placed in the receptacle, whereupon the plunger block 11 is positioned on the piece of butter, as is that shown in Figures 3 and 4. The utensil may then be applied to the ear of corn 15 and the heat of the corn will be imparted to and conducted by the receptacle 6, so that the butter therein will melt and pass on to the corn through the perforations 10.

It will be observed that the butter may be applied uniformly and without waste over the entire ear of corn.

It is believed that the advantages in use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A buttering device comprising a substantially rectangular butter receiving receptacle open at its upper end and having a concaved, perforated bottom wall conforming to the outer surface of an ear of corn, a handle carried by the receptacle, a gravity actuated plunger block slidably mounted in the receptacle, said plunger block having an inner concaved surface, and a finger grip carried by the plunger block.

FRANCIS A. PETERSON.

REFERENCES CITED

The following references are of record in the file of this patent:

UNITED STATES PATENTS

| Number | Name | Date |
|---|---|---|
| 140,169 | Sebille | June 24, 1873 |
| 205,004 | Smith | June 18, 1878 |
| 1,097,465 | Pratt | May 19, 1914 |
| 1,213,655 | Keil | Jan. 23, 1917 |
| 1,260,822 | Singleton | Mar. 26, 1918 |
| 1,893,889 | Guerini | Jan. 10, 1933 |
| 1,960,492 | Kahn | May 29, 1934 |
| 2,300,684 | Maxfield | Nov. 3, 1942 |
| 2,458,120 | Volpini | Jan. 4, 1949 |